Patented Oct. 13, 1953

2,655,503

UNITED STATES PATENT OFFICE 2,655,503

QUATERNARY SALTS OF γ-STILBAZOLINES

Arthur P. Phillips, New York, and Julio C. Castillo, White Plains, N. Y., assignors to Burroughs Wellcome & Co. (U. S. A.) Inc., Tuckahoe, N. Y., a corporation of New York No Drawing. Application March 29, 1951, Serial No. 218,279

4 Claims. (Cl. 260—293)

1

The present invention relates to new quaternary salts of 1-methyl 4-(4'-dimethylamino) stilbazolines having novel and unexpected curare-like properties. These compounds may be represented by the formula:

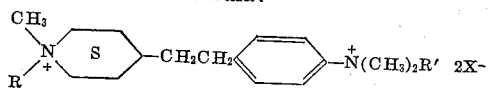

wherein R and R' are lower alkyl radicals at least one of which is methyl and $X^-$ is an anion. The limits of R and R' are quite critical. When both are methyl radicals the compound surpasses d-tubocurarine in potency and is superior in having no tendency to depress the blood pressure. The presence of an ethyl radical as R' gives a substance of about half the potency of its lower homologue, whereas if R' is methyl and R is ethyl, the potency is somewhat less but the duration of action is greatly prolonged. The compounds wherein both R and R' are either ethyl, propyl or butyl show only vestigial curare-like action and are potent inhibitors both of their lower homologues and of the decamethylene (C10) type of quaternary salts. These higher homologues are the subject of a separate application.

The scheme of synthesis of these substances is as follows:

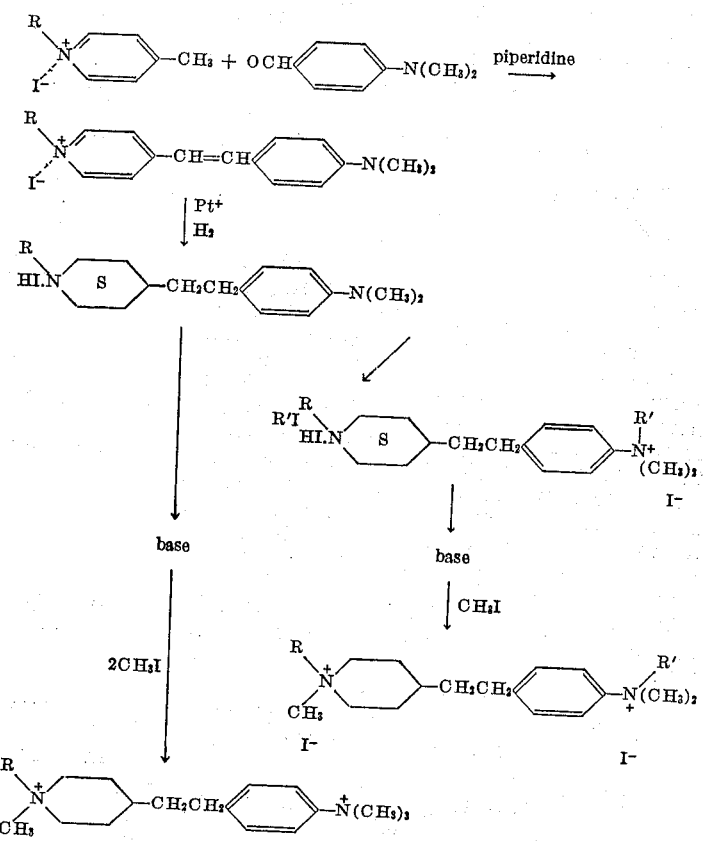

p-Dimethylaminobenzaldehyde is condensed with a γ-picoline alkiodide to form a γ-stilbazole alkiodide. This, on catalytic reduction, takes up four mols of hydrogen to give the hydroiodide of a γ-stilbazoline. In the main line of attack, this latter is converted to the free base which is treated with an excess of methyl iodide yielding the desired diquaternary salt. The substances having R=methyl and R'=higher alkyl are conveniently prepared by treating the stilbazoline hydroiodide with R'I, thus quaternizing the less basic nitrogen atom, after which basification and addition of methyl iodide affords the final product. One member of the last type can also be prepared by the main line of synthesis if p-methylethylaminobenzaldehyde be used in the initial condensation in place of p-dimethylaminobenzaldehyde.

This synthetic route up to the last step (i. e., through the stilbazoline hydroiodide) has already been described (Phillips, Jour. of Org. Chem., 12, 333 (1947); ibid. 14, 302 (1949); and Jour. Am. Chem. Soc., 72, 1850 (1950)), and the examples given here disclose only the process required to attain the diquaternary salts.

As will be seen from the scheme of synthesis, X⁻ is normally I⁻ and, in the doses to be used therapeutically there is no obvious advantage in employing a different anion. However, it is easy by conventional methods to transform the iodides into chlorides, nitrates etc. Use of alkyl bromides in the quaternization step affords bromides and use of dimethyl or diethyl sulfate gives metho and etho-sulfates. All non-toxic anions are to be regarded as equivalents for the purpose of this invention since the anion itself becomes infinitely diluted after injection by the enormous amounts of anions (especially chloride and phosphate anions) present in the body fluids. Only the cationic portion is of any importance for physiological purposes.

EXAMPLE 1

*1-methyl-4-(4'-dimethylaminophenethyl) piperidine bis methiodide*

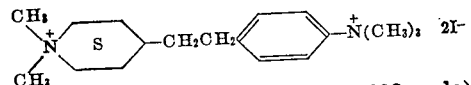

The base obtained from 12.5 g. (0.033 mole) of 1-methyl-4-(4'-dimethyl-aminophenethyl) piperidine hydroiodide (1-methyl-4'-dimethylaminostilbazoline hydroiodide) (Phillips, J. Amer. Chem. Soc., 72, 1850 (1950)) was taken up in ether, and dried over potassium carbonate. The solution was filtered from the desiccant and evaporated. The residual base (8.3 g.) was dissolved in methanol, 8 cc. of methyl iodide was added, and the solution was refluxed 8 hours on a steam-bath. The solvent and excess methyl iodide were then evaporated and the diquaternary salt was crystallized from methanol-ethylacetate mixtures, M. P. 183–185°.

Conversion to the chloride was accomplished by shaking with silver chloride in aqueous solution.

EXAMPLE 2

*1-ethyl-4-(4'-dimethylaminophenethyl) piperidine bis methiodide*

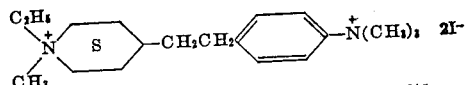

γ-Picoline ethiodide was condensed with p-dimethylaminobenzaldehyde and the resultant stilbazole ethiodide was reduced to give 1-ethyl-4-(4'-dimethylaminophenethyl) piperidine hydroiodide. The procedures were the same as those described for the 1-methyl analogue (J. Amer. Chem. Soc., 72, 1850 (1950). The hydroiodide was converted to the base and that to the bis methiodide by the method of Example 1. The product melted at 191–192°.

Similar treatment of γ-picoline n-propiodide and n-butiodide afforded by the same synthetic route the 1-n-propyl and 1-n-butyl homologues.

EXAMPLE 3

*1 - methyl - 4 - (4'-methylethylaminophenethyl) piperidine bis methiodide*

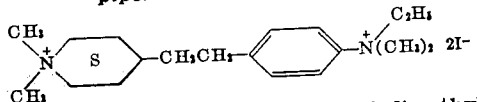

The hydroiodide of 1-methyl-4-(4'-dimethylaminophenethyl) piperidine (3.7 g.=0.01 mole) was refluxed 4 hours with 5 cc. of ethyl iodide. The excess ethyl iodide was evaporated and the residue was washed several times with ether. The ether-insoluble residue was stirred with 10 cc. of saturated potassium carbonate solution (there was no time when all the material was dissolved but the nature of the solid was visibly altered). The insoluble crystalline mass was then filtered, washed twice with saturated potassium carbonate solution, once with a little cold water and was then dried by washing with anhydrous ether. The solid was then dissolved in 10 cc. of methanol, 5 cc. of methyl iodide was added and the mixture was refluxed 3 hours. The product was recrystallized from methanol-ethyl acetate mixtures and then melted at 185–186°.

*Anal.*—Calcd. for C₁₉H₃₄N₂I₂: C, 41.9; H, 6.3; I, 46.7%. Found: C, 42.2; H, 6.1; I, 46.6%.

Similar procedures employing n-propyl iodide and n-butyl iodide in place of ethyl iodide result in the 4'-n-propyl and n-butyl homologues.

We claim:
1. A substance of the formula:

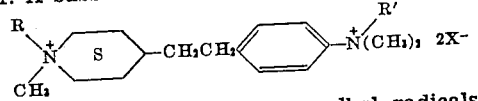

wherein R and R' are lower alkyl radicals of which at least one is methyl, X⁻ is the anion of a non-toxic acid and S indicates saturation of the ring.

2. A salt of the divalent cation:

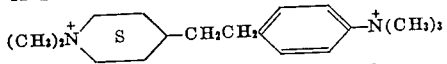

in combination with a non-toxic acid.

3. A salt of the divalent cation:

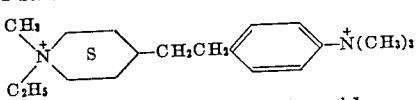

in combination with a non-toxic acid.

4. A salt of the divalent cation:

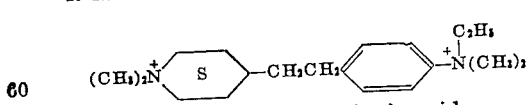

in combination with a non-toxic acid.

ARTHUR P. PHILLIPS.
JULIO C. CASTILLO.

References Cited in the file of this patent

Phillips (1), J. Org. Chem., vol. 12, pp. 333–341 (1947). Abstracted: Chem. Abst. 41, 4489 (1947).

Phillips (2), J. Org. Chem., vol. 14, pp. 302–305 (1949). Abstracted: Chem. Abst. 43, 7483 (1949).

Phillips (3), J. Av. Chem. Soc., vol. 72, pp. 1850–1852 (1950). Abstracted: Chem. Abst. 44, 4964–4965 (1950).